United States Patent [19]

Nebashi et al.

[11] Patent Number: 4,977,204

[45] Date of Patent: Dec. 11, 1990

[54] NON-AQUEOUS SHADE ENHANCING AGENT

[75] Inventors: Tsutomu Nebashi; Kazuo Iguchi, both of Utsunomiya; Moriyasu Murata, Chiba, all of Japan

[73] Assignee: Kao Corporation, Tokyo, Japan

[21] Appl. No.: 296,084

[22] PCT Filed: Feb. 25, 1988

[86] PCT No.: PCT/JP88/00200

§ 371 Date: Oct. 20, 1988

§ 102(e) Date: Oct. 20, 1988

[87] PCT Pub. No.: WO88/06655

PCT Pub. Date: Sep. 7, 1988

[30] Foreign Application Priority Data

Feb. 25, 1987 [JP] Japan .................... 62-42375

[51] Int. Cl.$^5$ ..................... C08K 5/16; C08K 5/20
[52] U.S. Cl. ..................... 524/186; 524/217; 524/236; 524/504; 524/571
[58] Field of Search ............ 524/186, 217, 504, 571, 524/236

[56] References Cited

U.S. PATENT DOCUMENTS 2,836,517 5/1958 Gruber et al. .................... 524/236
4,007,149 2/1977 Burton et al. .

FOREIGN PATENT DOCUMENTS 2700789 7/1978 Fed. Rep. of Germany .
62-104855 5/1987 Japan .................... 524/186

Primary Examiner—Joseph L. Schofer
Assistant Examiner—Mark Sweet
Attorney, Agent, or Firm—Flynn, Thiel, Boutell & Tanis

[57] ABSTRACT

A non-aqueous shade enhancing agent composition comprises (a) a copolymer obtained by graft-polymerizing a main chain polymer being substantially insoluble in a non-aqueous solvent having a solubility parameter in the range of 6.5 t0 10.0 with a branch polymer being soluble in said solvent at a weight ratio of the main chain polymer to the branch polymer in the range between 90/10 and 10/90 and (b) a specific quaternary ammonium salt.

9 Claims, No Drawings

NON-AQUEOUS SHADE ENHANCING AGENT

The invention relates to non-aqueous shade enhancing agent composition for a soft goods, in particular which serves to improve the chromophoric property of dyed material as well as the depth and sharpness of a color. It may be called as a non-aqueous shade improver or a non-aqueous color-enriching agent.

DESCRIPTION OF PRIOR ART

Heretofore, as a serious problem of a synthetic fiber, particularly a polyester type fiber, as compared with a natural fiber, such as wool, silk, etc., there has been mentioned a point that it is inferior to them in the depth and sharpness of the color of a dyed material. Accordingly, research has been continued to improve the sharpness and depth of color of a dyed material and some reports have been made.

For example, in "Dyes and Chemicals", Vol. 15, No. 1, p. 3 to 8 (1970), it has been explained experimentally and theoretically, based on the fact that when a dye cloth is wetted with water (refractive index: 1.33), it looks like dark and sharp, that if a dyed cloth is treated with a resin processing agent having a low refractive index, the same color-enriching effect as in wetting with water can be obtained, and further it was explained that the reason is that is decreases the surface reflectance. Also, in "Textile Engineering", Vol. 26, No. 3, p. 188 (1973), in the summary of discussion entitled "Textile surface and color developability", color development of a polyester fiber due to a disperse dye decreases the reflectance of a surface layer, and in order to increase the light volume incident in the fiber and heighten the color development efficiency, it is effective to form a layer having a suitable refractive index on a surface of the fiber, and it is disclosed that by coating a low polymerized material of trifluorochloroethylene (refractive index: 1.4) on a dyed PET filament, it becomes dark in color.

Various proposals have been effected based on these facts. In Japanese Provisional Patent Publication No. 111192/1978, there has been disclosed a fiber structural material having a thin film formed by a polymer having a refractive index of 1.50 or less, and as a method for preparation, there has been proposed a method in which a monomer cable of forming a polymer having a refractive index of 1.5 or less is charged in a closed apparatus with the fiber and is subjected to plasma polymerization or discharge graft polymerization to form a thin film. Also, in Japanese Provisional Patent Publication No. 26232/1980, there is disclosed a method in which a compound having a low refractive index of 1.45 or less is adsorbed onto a surface of a fiber structural material, in an amount of 0.3% to 10%, in the form of a thin film, and then dry heating or wet heating processing is carried out. Further, as a starting material for formation of the thin film, there has been described that a fluorine resin, an acrylate resin, a vinyl polymer or a silicone resin having a refractive index of the polymer of 1.45 or less can be used, and as a concrete example, there has been disclosed a method in which by using an emulsified material or a solvent solution of a fluorine-containing compound or acrylate, fiber is dipped therein and adsorbed at a high temperature or after spray coating, dry heating or wet heating processing is carried out to form a thin film on the fiber.

However, the method disclosed in Japanese provisional Patent Publication No. 111192/1978 has many disadvantages in that since it is a batch producing system, the efficiency is bad, and it requires specific facilities, and when polymerization of monomers is required, the loss of the polymer is remarkable since the polymerized polymer attaches to a wall of the apparatus and washing thereof is troublesome whereby the method is not suitable for industrial production. Also, in the method disclosed in Japanese provisional Patent Publication No. 26232/1980, a large amount of a solution should be heated to a high temperature since uniform adsorption is possible only at a high temperature in a dipping method with a large bath ratio, so that it has a defect of high cost from the view point of saving energy. On the other hand, in the spray coating method, dangerous and complicated operations are necessary and therefore it has a fatal defect that the finish becomes dappled since the coating amount becomes non-uniform.

Also, in Japanese provisional Patent Publication No. 176275/1982, there has been disclosed a color-enriching processing agent comprising a polymer in which a superstrate segment having a blocked polyfluoroalkyl group is bonded to a backbone segment. However, the polymer and a solvent are special ones and its utilization value in industry is small.

SUMMARY OF THE INVENTION

In order to find a non-aqueous type color-enriching agent which can use a cheap non-aqueous solvent such as tetrachloroethylene, trichloroethane, etc. as a solvent and has great utilization value in industry, the present inventors have intensively studied concerning a necessary function to develop a color-enriching effect and as a result, the following finding has been obtained.

That is, the color-enriching effect of a synthetic fiber, particularly a polyester type fiber is insufficient when a film of a low refractive index is formed and a remarkable color-enriching effect can be obtained by roughening the polymer on a surface of the fiber. Thus, in order to adsorb a polymer on a synthetic fiber, particularly a polyester type fiber and roughen the surface of the polymer, it is necessary that the polymer is insoluble to in a solvent and disperses therein stably, i.e., it becomes a non-aqueous emulsion. For this purpose, a graft copolymerized material which is obtained by graft polymerization of a backbone polymer insoluble in a solvent with a superstrate polymer soluble in the solvent is suitable.

Further, in natural fibers, such as wool, silk, etc., by adsorbing a polymer on a surface of the fiber and roughening the surface, as in synthetic fibers such as polyester, etc., the depth of color and sharpness become good whereby a color-enriching effect can be obtained. However, even if the natural fibers, such as wool and silk, are treated only by a graft polymerized material, adhesion is not good and a sufficient color-enriching effect cannot be obtained. For heightening the color-enriching effect to the natural fibers, such as wool and silk, it is necessary that adherability of the graft polymerized material should be improved. The present inventors have intensively studied concerning a color-enriching agent capable of obtaining a color-enriching effect in both of synthetic fibers, such as a polyester, and natural fibers, such as wool and silk, and as a result, accomplished the present invention.

The invention provides a non-aqueous shade enhancing agent composition which comprises:

(a) a copolymer obtained by graft-polymerizing a main chain polymer being substantially insoluble in a non-aqueous solvent having a solubility parameter in the range of 6.5 to 10.0 with a branch polymer being soluble in said solvent at a weight ratio of the main chain polymer to the branch polymer in the range between 90/10 and 10/90 and (b) a quaternary ammonium salt having the formula (1):

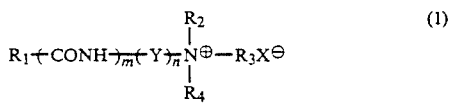

in which $R_1$ is an alkyl having 8 to 22 carbon atoms, $R_2$ is an alkyl having 1 to 22 carbon atoms, hydroxyethylor hydroxypropyl, $R_3$ and $R_4$ are each an alkyl having 1 to 3 carbon atoms, hydroxyethyl or hydroxypropyl, at least one of $R_3$ and $R_4$ being hydroxyethyl or hydroxypropyl, Y is a group of ethylene or propylene, m is zero or 1, n is a number of zero to 5 and X- is an anion of hydrochloric acid, nitric acid, sulfuric acid, phosphoric acid, perchloric acid, paratoluenesulfonic acid or a hydroxyalkanecarboxylic acid having 2 to 6 carbon atoms, at a weight ratio of (a) to (b) in the range of 95/5 to 20/80.

The copolymer to use in the invention consists essentially of the main chain polymer portion, or the backbone polymer, and the branch chain polymer portion, or the superstrate polymer.

It is preferred that the main chain polymer is polybutadiene or a copolymer of butadiene and the branch polymer is a vinyl polymer or a vinyl copolymer.

It is preferred that the anion of paratoluenesulfonic acid or hydroxyalkanecarboxylic acid having 2 to 6 carbon atoms.

The composition may comprises 1 to 20 percent by weight of the copolymer (a) and 0.5 to 30 percent by weight of the quaternary ammonium salt (b). It may further comprise a solvent from the practical point of view. That is, it may comprise 0.05 to 5 percent by weight of a mixture of the copolymer (a) and the quaternary ammonium salt (b) and the balance of a non-aqueous solvent having a solubility parameter of 6.5 to 10.0.

The backbone polymer in the copolymerized material of the present invention may be those which are substantially insoluble in said solvent, and there may be mentioned, for example, polybutadiene or a copolymer of (a) at least one or more monomers capable of copolymerizing with butadiene and (b) butadiene.

The superstrate polymer may be those which are soluble to said solvent, and there may be mentioned, for example, a copolymer of at least one vinyl monomer. More specifically, as a monomer which is capable of copolymerizing with butadiene, there may be mentioned acrylonitrile, acrylate, methacrylate, aromatic vinyl, etc. Also, as the vinyl monomer which is to polymerize with the backbone polymer, there may be mentioned styrene, α-methyl styrene, α-ethyl styrene; or nucleus-substituted derivatives thereof of aromatic vinyl monomers such as vinyl toluene, isopropenyl toluene, chlorostyrene, styrene, etc.; methacrylate monomers such as methyl methacrylate, ethyl methacrylate, isobutyl methacrylate, normal butyl methacrylate, etc.; acrylate monomers such as methyl acrylate, ethyl acrylates, normal butyl methacrylates, etc.

The weight ratio of the backbone polymer/the superstrate polymer is in the range of 90/10 to 10/90, preferably 80/20 to 20/80. If only the backbone polymer is present, it is insoluble in the solvent and yet a secondary aggregated polymer at polymer purification cannot be uniformly and stably dispersed in a solvent whereby it is not suitable for a color-enriching agent. On the other hand, if only the superstrate polymer is present, it is soluble in the solvent and a smooth film can be formed on a surface of a fiber but roughening of the surface cannot be obtained so that a sufficient color-enriching effect cannot be obtained. To the contrary, when the superstrate polymer which is soluble in a solvent is graft polymerized with the backbone polymer which is insoluble in a solvent according to the present invention, while the copolymerized material is insoluble in a non-aqueous solvent, it is stably dispersed in a solvent to form a non-aqueous emulsion and the emulsion forms a rough surface due to fine particles of 0.2μ or less on a surface of the fiber. Therefore, it has an excellent color-enriching effect as a non-aqueous color-enriching agent.

When the backbone polymer of the present invention is a copolymer of butadiene and another monomer, the content of butadiene is preferably 30% by weight or more, particularly 50% by weight or more is desired. If the content of butadiene is less than 30% by weight, a color-enriching agent obtained by graft polymerization hardly forms a stable non-aqueous emulsion, and an increase in particle size due to secondary aggregation is caused so that the color-enriching effect is bad.

In the present invention, the backbone polymer to be graft polymerized should form a latex, and its average particle size is desirably 0.2μ or less, preferably 0.15μ or less. If the average particle size exceeds 0.2μ, the stability of the resulting non-aqueous emulsion is bad and the color-enriching effect is little.

In the color-enriching agent of the present invention, a cross-linking agent may be added at polymerization of the backbone polymer or graft polymerization of the superstrate polymer in order to improve iron resistance (ironability). As the cross-linking agent, there may be mentioned bifunctional monomers such as divinyl benzene, dimethacrylate, e.g., mono-, di, tri- or tetraethylene dimethacrylate, 1,3-butylene glycol dimethacrylate, etc.

The copolymerized material of the present invention is preferably formulated in an amount of 1 to 20% by weight in the composition.

In the quaternary ammonium salt represented by the formula (1) to be used in the present invention, those having less than 8 or more than 22 carbon atoms are not preferred since a lowering in desired properties, particularly in charge preventive effect, is observed.

Further, as $X^{\ominus}$, there may be mentioned acid residue of hydrochloric acid, nitric acid, sulfuric acid, phosphoric acid, perchloric acid or para-toluenesulfonic acid, and a hydroxyalkane carboxylic acid having 2 to 6 carbon atoms. Above all, an acid residue of para-toluenesulfonic acid and hydroxyalkane carboxylic acid (particularly glycollic acid) are preferred. As specific examples of the preferred quaternary ammonium salt, there may be mentioned stearyldimethylhydroxyethyl ammonium paratoluenesulfonate, palmityldimethylhydroxyethyl ammonium paratoluenesulfonate, stearoylaminoethyldimethylhydroxyethyl ammonium paratoluenesulfonate, dilauryldihydroxyethyl, ammonium paratoluenesulfonate, distearyldihydroxypropyl ammonium paratoluenesulfonate, coconut or beef tallow alkyldimethylhydroxyethyl ammonium paratoluenesulfonate, stearyldimethylhydroxyethyl ammonium paratoluenesulfonate, stearoylaminoethyldimethylhydroxy ammonium hydroxypropionate, palmityldimethylhydroxyethyl ammonium glycolate, dilauryldihydroxyethyl ammonium glucolate, stearyltrihydroxyethyl ammonium glycolate, myristyldihydroxyethylhydroxypropyl ammonium glycolate, etc. The quaternary ammonium salt is preferably formulated in an amount of 0.5 to 30% by weight in the composition.

In the present invention, the copolymerized material/quaternary ammonium salt is used in weight ratio of 95/5 to 20/80, but is it preferred to use in the ratio of 95/5 to 30/70. Out of the above range, if the amount of the quaternary ammonium salt is little, a color-enriching effect in the natural fibers such as wool, etc. cannot sufficiently be obtained. On the other hand, if the amount of the quaternary ammonium salt is too large, it is not preferred since the heat resistance (ironing resistance) of a clothing is bad.

The non-aqueous color-enriching agent of the present invention is prepared as a composition by diluting and dispersing both of the above components (a) and (b) in a solvent, and the solvent to be used is not limited. For example, a solvent for synthesis mentioned below, a petroleum solvent, an alcoholic solvent, a ketone solvent, tetrahydrofuran, dioxane, etc. may be used. Also, water may be added in the range capable of dissolving the polymer.

Contents of the contents (a) and (b) in the composition are preferably in sum 5 to 30% by weight.

In the non-aqueous color-enriching agent of the present invention, if necessary, surfactants such as anionic or nonionic, a hydrotrope agent for improvement of stability of the system, oily agents such as silicone for improvement of the iron slip property, and further perfumes, dyes, pigments, fluorescent dyes, anti-fungus agents, antiseptic agents, etc. may be added.

The non-aqueous color-enriching agent of the present invention can be used by diluting and dispersing in the range of 0.05 to 5% by weight, preferably 0.3 to 2% by weight in a non-aqueous solvent. As the solvent for dilution and dispersion, there may be mentioned a non-aqueous solvent having a solubility parameter in the range of 6.5 to 10.0, and for example, synthetic solvents such as tetrachloroethylene, trichloroethylene, trichloroethane, trichlorotrifluoroethane, etc.; naphthene, petroleum solvent with high paraffin content, etc. may be used. If necessary, an alcoholic solvent such as methanol, ethanol, isobutanol and normal butanol; a ketone series solvent such as methyl ethyl ketone and acetone; and tetrahydrofuran, dioxane, etc. may be added.

[EXAMPLES]

In the following, the present invention will be described in more detail, but the present invention is not limited by these Examples. In the Example, all parts and % are based on weight otherwise expressly mentioned.

EXAMPLE 1

A graft polymerized material was synthesized by the following method.

(A) Polymerization of a backbone polymer

| | |
|---|---|
| 1,3-Butadiene | 75 parts |
| Styrene | 25 |
| Sodium lauryl sulfate | 3.0 |
| Potassium persulfate | 0.25 |
| Dodecylmeniaptan | 0.15 |
| Water | 150 |

The above formulated material was polymerized at 60° C. for 24 hours. The rate of polymerization reached 92% or more. An average particle size of the latex thereby obtained was 0.084μ. This was used as the backbone polymer and isobutyl methacrylate was used as the superstrate polymer, and graft polymerization was carried out with the following formulation:

(B) Graft polymerization of a superstrate polymer

| | |
|---|---|
| Backbone polymer | X part |
| Isobutyl methacrylate | Y |
| Cumenhydroperoxide | 0.75 |
| beef tallow aliphatic acid potassium salt | 1.5 |
| Sodium salt of β-naphthalenesulfonic acid-formalin condensate | 0.15 |
| dl-Glucose | 1.0 |
| Ferrous sulfate | 0.01 |
| Water | 160 |

Polymerization was carried out at 70° C. for 6 hours and the resulting latex was poured into methanol to aggregate and precipitate the graft polymerized material, and after filtration, the residue was washed three times with methanol and dried.

By using the copolymerized material obtained, the composition as shown in Table 1 was prepared and the color-enriching effect was investigated by the following.

The sample obtained was diluted and dispersed in tetrachloroethylene with a concentration of 1.0%, and into the solution were dipped a polyester tuft with a black ground and a wool muslin with a black ground for 1 minute and they were dried with air. The color-enriching effect was measured by light and dark index L value with a colorimetry color difference meter (produced by Nippon Denshoku Kogyo K.K., ND-1000lDP type). Smaller L value indicates dark color. The results are shown in Table 1.

TABLE 1

| | | Comparative example | This invention | | | | | Comparative example |
|---|---|---|---|---|---|---|---|---|
| Copolymer composition (%) | Backbone polymer X | 0 | 10 | 20 | 50 | 80 | 90 | 100 |
| | Isobutyl meth- Y acrylate | 100 | 90 | 80 | 50 | 20 | 10 | 0 |
| Formulated composition | Copolymer | 10 | 10 | 10 | 10 | 10 | 10 | 10 |
| | Stearyldimethyl-hydroxyethyl ammonium paratoluenesulfonate | 5 | 5 | 5 | 5 | 5 | 5 | 5 |
| | Tetrachloroethylene | 85 | 85 | 85 | 85 | 85 | 85 | 85 |

The rightmost column also indicates "Untreated".

TABLE 1-continued

|  |  | Comparative example | This invention | | | | Comparative example | |
|---|---|---|---|---|---|---|---|---|
| Dilution and dispersibility in tetrachloroethylene | | Dissolved | *2 | | | | Insoluble*3 | |
| Polyester tuft | L value | 18.1 | 17.0 | 16.8 | 16.7 | 17.4 | 17.5 | — | 18.7 |
|  | ΔL*1 | 0.6 | 1.7 | 1.9 | 1.4 | 1.3 | 1.2 | — |  |
| Wool muslin | L value | 11.3 | 10.4 | 10.0 | 10.2 | 10.3 | 10.5 | — | 11.5 |
|  | ΔL*1 | 0.2 | 1.1 | 1.5 | 1.3 | 1.2 | 1.0 | — |  |

*1ΔL = L value of untreated material − L value of treated material
*2Good dispersibility
*3Bad dispersibility The color-enriching agents of the present invention become non-aqueous emulsions in tetrachloroethylene, the same manner as in Example 1. The results are shown in Table 2.

TABLE 2

| Formulation | This invention | | | | | | | | | |
|---|---|---|---|---|---|---|---|---|---|---|
|  | 1 | 2 | 3 | 4 | 5 | 6 | 7 | 8 | 9 | 10 |
| Copolymer | 9.5 | 9 | 8 | 7 | 6 | 5 | 4 | 3 | 2 | 6 |
| Stearyldimethylhydroxyethyl ammonium paratoluenesulfonate | 0.5 | 1 | 2 | 3 | 4 | 5 | 6 | 7 | 8 | 4 |
| Stearoylaminoethyldimethylhydroxyethyl ammonium paratoluenesulfonate |  |  |  |  |  |  |  |  |  |  |
| Stearyldimethylhydroxyethyl ammonium glycolate |  |  |  |  |  |  |  |  |  |  |
| Dilaurylhydroxyethyl ammonium glycolate |  |  |  |  |  |  |  |  |  |  |
| Myristyldihydroxyethylhydroxypropyl ammonium glycolate |  |  |  |  |  |  |  |  |  |  |
| Tetrachloroethylene | 90 | 90 | 90 | 90 | 90 | 90 | 90 | 90 | 90 | 90 |
| Ratio of copolymer/quaternary ammonium salt | 95/5 | 90/10 | 80/20 | 70/30 | 60/40 | 50/50 | 40/60 | 30/70 | 20/80 | 60/40 |
| Dilution and dispersibility in tetrachloroethylene | *2 |  |  |  |  |  |  |  |  |  |
| Polyester tuft  L value | 16.1 | 17.0 | 16.9 | 16.7 | 16.7 | 16.9 | 17.2 | 17.2 | 17.3 | 16.7 |
|  ΔL*1 | 1.6 | 1.7 | 1.8 | 2.0 | 2.0 | 1.8 | 1.7 | 1.5 | 1.4 | 2.0 |
| Wool muslin  L value | 10.5 | 10.3 | 10.1 | 10.1 | 10.0 | 10.0 | 10.1 | 10.0 | 10.0 | 10.0 |
|  ΔL*1 | 1.0 | 1.2 | 1.4 | 1.4 | 1.5 | 1.5 | 1.4 | 1.5 | 1.5 | 1.5 |

| Formulation | This invention | | | | Comparative example | | | |
|---|---|---|---|---|---|---|---|---|
|  | 11 | 12 | 13 | 14 | 15 | 16*3 | 17*3 | 18*3 |
| Copolymer | 6 | 6 | 6 | 6 | 10 | 1.5 | 1 |  |
| Stearyldimethylhydroxyethyl ammonium paratoluenesulfonate |  |  |  |  |  | 8.5 | 9 | 10 |
| Stearoylaminoethyldimethylhydroxyethyl ammonium paratoluenesulfonate | 4 |  |  |  |  |  |  |  | Untreated |
| Stearyldimethylhydroxyethyl ammonium glycolate |  | 4 |  |  |  |  |  |  |
| Dilaurylhydroxyethyl ammonium glycolate |  |  | 4 |  |  |  |  |  |
| Myristyldihydroxyethylhydroxypropyl ammonium glycolate |  |  |  | 4 |  |  |  |  |
| Tetrachloroethylene | 90 | 90 | 90 | 90 | 90 | 90 | 90 | 90 |
| Ratio of copolymer/quaternary ammonium salt | 60/40 | 60/40 | 60/40 | 60/40 | 100/0 | 15/85 | 10/90 | 0/100 |
| Dilution and dispersibility in tetrachloroethylene |  |  |  |  |  |  |  | dissolved |
| Polyester tuft  L value | 16.7 | 16.7 | 16.7 | 16.7 | 16.2 | 17.7 | 17.7 | 17.9 | 18.7 |
|  ΔL*1 | 2.0 | 2.0 | 2.0 | 2.0 | 1.5 | 1.0 | 1.0 | 0.8 | — |
| Wool mulsin  L value | 10.0 | 10.0 | 10.0 | 10.0 | 10.8 | 10.2 | 10.2 | 10.2 | 11.5 |
|  ΔL*1 | 1.5 | 1.5 | 1.5 | 1.5 | 0.7 | 1.3 | 1.3 | 1.0 | — | respectively, and they are good in dilution dispersibility and have excellent color enriching effect in both of polyester and wool.

EXAMPLE 2

By using a copolymerized material in which a ratio of the backbone polymer (X) and isobutyl methacrylate (Y) in the graft copolymerized material was 20/80, and by varying a formulation ratio to a quaternary ammonium salt and also using various quaternary ammonium salts, treatments and measurements were carried out in the same manner as in Example 1. The results are shown in Table 2.

What is claimed is:

1. A non-aqueous shade enhancing agent composition which comprises:
(a) a copolymer obtained by graft-polymerizing (i) a main chain polymer which is substantially insoluble in a non-aqueous solvent having a solubility parameter in the range of 6.5 to 10.0, with (ii) a branch polymer which is soluble in said solvent, at a weight ratio of the main chain polymer to the branch polymer in the range between 90/10 and 10/90, said main chain polymer being polybutadiene or a copolymer of butadiene and another monomer which is copolymerizable with butadiene, and said branch polymer being a vinyl polymer or a vinyl copolymer, and (b) a quaternary ammonium salt having the formula (1):

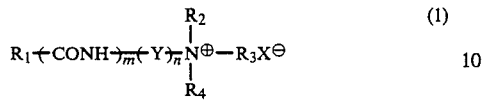

in which $R_1$ is alkyl having 8 to 22 carbon atoms, $R_2$ is an alkyl having 1 to 22 carbon atoms, hydroxyethyl or hydroxypropyl, $R_3$ and $R_4$ are each an alkyl having 1 to 3 carbon atoms, hydroxyethyl or hydroxypropyl, at least one of $R_3$ and $R_4$ being hydroxyethyl or hydroxypropyl, Y is ethylene or propylene, m is zero or 1, n is a number of zero to 5 and X- is an anion of hydrochloric acid, nitric acid, sulfuric acid, phosphoric acid, perchloric acid, paratoluenesulfonic acid or a hydroxyalkanecarboxylic acid having 2 to 6 carbon atoms, at a weight ratio of (a) to (b) in the range of 95/5 to 20/80.

2. A composition as claimed in claim 1, in which said main chain polymer contains at least 30 percent by weight of butadiene, based on the weight of said main chain polymer.

3. A composition as claimed in claim 1, in which said main chain polymer has an average particle size of 0.2 micron or less.

4. A composition as claimed in claim 1, in which said anion is an anion of paratoluenesulfonic acid or hydroxyalkanecarboxylic acid having 2 to 6 carbon atoms.

5. A composition as claimed in claim 1, which comprises 1 to 20 percent by weight of the copolymer (a) and 0.5 to 30 percent by weight of the quaternary ammonium salt (b).

6. A composition as claimed in claim 1, which further comprises a solvent.

7. A composition as claimed in claim 1, which comprises 0.05 to 5 percent by weight of the copolymer (a) and the quaternary ammonium salt (b) and a non-aqueous solvent having a solubility parameter of 6.5 to 10.0.

8. A non-aqueous, shade-enhancing agent, consisting essentially of: (I) from 5 to 30 percent by weight of a mixture of a graft copolymer (a) and a quaternary ammonium salt (b), with the proviso that the weight ratio of (a) to (b) in said mixture is from 95/5 to 20/80, and (II) the balance is a non-aqueous organic solvent having a solubility parameter of from 6.5 to 10;

said graft copolymer being emulsified in said solvent and having a particle size of 0.2μ or less, said graft copolymer (a) consisting of (i) a backbone polymer which is substantially insoluble in said non-aqueous organic solvent, and (ii) a branch polymer which is soluble in said non-aqueous organic solvent, the weight ratio of said backbone polymer (i) to said branch polymer (ii) being from 90/10 to 10/90, said backbone polymer being polybutadiene or a copolymer of butadiene with another monomer which is copolymerizable with butadiene, and said branch polymer being a vinyl polymer or a vinyl copolymer;

said quaternary ammonium salt (b) having the formula

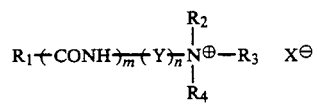

in which $R_1$ is alkyl having 8 to 22 carbon atoms, $R_2$ is alkyl having 1 to 22 carbon atoms, hydroxyethyl or hydroxypropyl, $R_3$ and $R_4$, which can be the same or different, are alkyl having 1 to 3 carbon atoms, hydroxyethyl or hydroxypropyl, with the proviso that at least one of $R_3$ and $R_4$ is hydroxyethyl or hydroxypropyl, Y is ethylene or propylene, m is zero or 1, n is a number of zero to 5, and X is an anion of hydrochloric acid, nitric acid, sulfuric acid, phosphoric acid, perchloric acid, paratoluene sulfonic acid or hydroxyalkane carboxylic acid having from 2 to 6 carbon atoms.

9. A non-aqueous, shade-enhancing agent, considering essentially of (I) from 0.05 to 5 percent by weight of a mixture of a graft copolymer (a) and a quaternary ammonium salt (b), the weight ratio of (a) to (b) in said mixture being from 95/5 to 20/80, and (II) the balance is a non-aqueous organic solvent having a solubility parameter of from 6.5 to 10;

said graft copolymer being emulsified in said solvent and having a particle size of 0.2μ or less, said graft copolymer (a) consisting of (i) a backbone polymer consisting of a copolymer of butadiene and styrene, said copolymer containing at least 50 percent by weight of units derived from butadiene, and (ii) a branch polymer of isobutyl methacrylate, the weight ratio of said backbone polymer (i) to said branch polymer (ii) being from 90/10 to 10/90;

said quaternary ammonium salt (b) having the formula

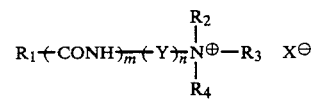

in which $R_1$ is alkyl having 8 to 22 carbon atoms, $R_2$ is alkyl having 1 to 22 carbon atoms, hydroxyethyl or hydroxypropyl, $R_3$ and $R_4$, which can be the same of different are alkyl having 1 to 3 carbon atoms, hydroxyethyl or hydroxypropyl, with the proviso that at least one of $R_3$ and $R_4$ is hydroxyethyl or hydroxypropyl, Y is ethylene or propylene, m is zero or 1, n is a number of zero to 5, and X is an anion of para-toluene sulfonic acid or hydroxyalkane carboxylic acid having from 2 to 6 carbon atoms.

* * * * *

UNITED STATES PATENT AND TRADEMARK OFFICE
CERTIFICATE OF CORRECTION

PATENT NO.   : 4,977,204
DATED        : December 11, 1990
INVENTOR(S)  : Tsutomu NEBASHI et al It is certified that error appears in the above-identified patent and that said Letters Patent is hereby corrected as shown below:

Column 10, lines 25-26; change "considering" to
  ---consisting---.
       line 53; change "of different" to
  ---or different---.

Signed and Sealed this

Sixth Day of October, 1992

Attest:

DOUGLAS B. COMER

Attesting Officer

Acting Commissioner of Patents and Trademarks